United States Patent
Solt et al.

(10) Patent No.: US 12,330,505 B2
(45) Date of Patent: Jun. 17, 2025

(54) SIMULATED SHIFTS AND MODES FOR BATTERY ELECTRIC VEHICLE DRIVING

(71) Applicant: FCA US LLC, Auburn Hills, MI (US)

(72) Inventors: Michael B Solt, Oxford, MI (US); Jamie F Standring, Beverly Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 237 days.

(21) Appl. No.: 18/170,988

(22) Filed: Feb. 17, 2023

(65) Prior Publication Data

US 2023/0302918 A1    Sep. 28, 2023

Related U.S. Application Data (60) Provisional application No. 63/322,726, filed on Mar. 23, 2022.

(51) Int. Cl.
*B60L 15/20*    (2006.01)
*F16H 61/26*    (2006.01)

(52) U.S. Cl.
CPC .............. *B60L 15/20* (2013.01); *F16H 61/26* (2013.01); *B60L 2240/423* (2013.01); *B60L 2250/28* (2013.01)

(58) Field of Classification Search
None
See application file for complete search history.

(56) References Cited

U.S. PATENT DOCUMENTS

| | | |
|---|---|---|
| 8,834,266 B2 | 9/2014 | Thorner |
| 9,815,404 B2 | 11/2017 | Peachey et al. |
| 10,967,848 B2 | 4/2021 | Ruybal et al. |
| 2019/0118815 A1 | 4/2019 | Jordan et al. |
| 2021/0206254 A1 | 7/2021 | Benedikt |
| 2021/0387531 A1* | 12/2021 | Oh .................... B60L 15/20 |

OTHER PUBLICATIONS

International Search Report and Written Opinion dated Jun. 29, 2023 for International Application No. PCT/US2023/063632, International Filing No. Mar. 3, 2023.

* cited by examiner

*Primary Examiner* — Christian Chace
*Assistant Examiner* — Shayne M. Gilbertson
(74) *Attorney, Agent, or Firm* — Jeremy J. Klobucar (57) ABSTRACT

A simulated shift system for a battery electric vehicle (BEV) includes a set of sensors configured to monitor a set of parameters indicative of driver input by a driver of the BEV and a controller configured to control an electric drive module (EDM) of the BEV, the EDM comprising a gear system connected to an electric motor and being configured to output drive torque to a driveline of the BEV, receive the monitored set of parameters, and, based on the monitored set of parameters, selectively control the EDM to adjust drive torque output therefrom to simulate transmission shift operations of a predetermined conventional automotive automatic transmission having four or more speeds.

14 Claims, 10 Drawing Sheets

SIMULATED SHIFTS AND MODES FOR BATTERY ELECTRIC VEHICLE DRIVING

CROSS-REFERENCE TO RELATED APPLICATION(S)

The present application claims the benefit of U.S. Provisional Application No. 63/322,726, filed on Mar. 23, 2022. The disclosure of the above-identified application is herein incorporated by reference in its entirety.

FIELD

The present application generally relates to battery electric vehicles (BEVs) and, more particularly, to techniques for providing simulated shifts and modes for BEVs.

BACKGROUND

Battery electric vehicles (BEVs) typically include one or more electric drive modules (EDMs) each combining an electric motor, a gearbox (e.g., a gear reducer), and an inverter. One or more high voltage battery systems provide electrical energy to the EDM(s), which in turn generate and transfer a desired amount of drive torque to a driveline of the BEV for propulsion. High voltage could alternatively be supplied/supplemented by a range-extender engine system or a fuel cell system. The gearbox/gear reducer typically comprises only one or two speeds and thus functions completely different than a conventional multi-speed automatic transmission (e.g., having three or more, and more likely, four or more speeds). One potential downside of driving a BEV, therefore, is the lack of a traditional driving/shifting experience, which could be monotonous and boring to the driver. This is further illustrated by the output torque/power vs. vehicle speed plots of FIGS. 1A-1D, which clearly shows the constant provision of output power/torque across varying vehicle speeds, even with a multi-speed (two-speed) EDM. Accordingly, while such conventional BEV propulsion control systems do work well for their intended purpose, there exists an opportunity for improvement in the relevant art.

SUMMARY

According to one example aspect of the invention, a simulated shift system for a battery electric vehicle (BEV is presented. In one exemplary implementation, the simulated shift system comprises a set of sensors configured to monitor a set of parameters indicative of driver input by a driver of the BEV and a controller configured to control an electric drive module (EDM) of the BEV, the EDM comprising a gear system connected to an electric motor and being configured to output drive torque to a driveline of the BEV, receive the monitored set of parameters, and, based on the monitored set of parameters, selectively control the EDM to adjust drive torque output therefrom to simulate transmission shift operations of a conventional automatic transmission having three or more speeds.

In some implementations, the monitored set of parameters include at least one of (i) a shifting mode, (ii) a maximum defined torque level relative to a maximum torque level achievable by the EDM, and (iii) a number of shift speeds. In some implementations, the controller is configured to control the EDM to adjust the EDM drive torque output to simulate transmission shift operations by controlling the EDM drive torque output relative to the maximum defined torque level (i) according to ascending torque steps instead of outputting constant torque and (ii) according to descending torque steps instead of outputting constant power. In some implementations, the controller is configured to simulate a particular transmission shift operation by (i) maintaining the electric motor at a constant speed and (ii) during a first simulated torque phase, decreasing the torque output of the EDM at a first defined rate and, during a subsequent second simulated inertia phase, increasing the torque output of the EDM at a second defined rate. In some implementations, the first and second defined rates correspond to the shifting mode.

In some implementations, the EDM is a single-speed EDM and the gear system has one single gear, wherein the EDM does not have a transmission control module (TCM), and wherein the simulated shift system only performs simulated transmission shifts. In some implementations, the EDM is a dual or dual-speed EDM and the gear system has at least two gears and the EDM has a transmission control module (TCM) for controlling actual shifting between the at least two gears. In some implementations, the EDM is configured to (i) operate in a second higher gear and not a lower first gear unless (ii) an accelerator pedal is fully depressed at wide-open throttle (WOT), wherein the EDM is configured to output its maximum achievable drive torque beginning in the lower first gear. In some implementations, the BEV does not include an internal combustion engine or the conventional multi-speed automatic transmission configured for use with the internal combustion engine.

According to another example aspect of the invention, a simulated shift method for a battery electric vehicle (BEV) is presented. In one exemplary implementation, the simulated shift system method comprises monitoring, by a controller of the BEV and using a set of sensors, a set of parameters indicative of driver input by a driver of the BEV, controlling, by the controller, an electric drive module (EDM) of the BEV, the EDM comprising a gear system connected to an electric motor and being configured to output drive torque to a driveline of the BEV, receiving, by the controller, the monitored set of parameters, and, based on the monitored set of parameters, selectively controlling, by the controller, the EDM to adjust drive torque output therefrom to simulate transmission shift operations of a conventional multi-speed automatic transmission having three or more speeds.

In some implementations, the monitored set of parameters include at least one of (i) a shifting mode, (ii) a maximum defined torque level relative to a maximum torque level achievable by the EDM, and (iii) a number of shift speeds. In some implementations, controlling the EDM to adjust the EDM drive torque output to simulate transmission shift operations further comprises controlling, by the controller, the EDM drive torque output relative to the maximum defined torque level (i) according to ascending torque steps instead of outputting constant torque and (ii) according to descending torque steps instead of outputting constant power. In some implementations, simulating a particular transmission shift operation further comprises (i) maintaining, by the controller, the electric motor at a constant speed and (ii) during a first simulated torque phase, decreasing, by the controller, the torque output of the EDM at a first defined rate and, during a subsequent second simulated inertia phase, increasing, by the controller, the torque output of the EDM at a second defined rate. In some implementations, the first and second defined rates correspond to the shifting mode.

In some implementations, the EDM is a single-speed EDM and the gear system has one single gear, wherein the EDM not have a transmission control module (TCM), and wherein the simulated shift system only performs simulated transmission shifts. In some implementations, the EDM is a dual or dual-speed EDM and the gear system has at least two gears and the EDM has a transmission control module (TCM) for controlling actual shifting between the at least two gears. In some implementations, the EDM is configured to operate in a second higher gear and not a lower first gear unless (ii) an accelerator pedal is fully-depressed at wide-open throttle (WOT) he EDM is configured to output its maximum achievable drive torque beginning in the lower first gear. In some implementations, the BEV does not include an internal combustion engine or the conventional multi-speed automatic transmission configured for use with the internal combustion engine.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As discussed above and illustrated in FIGS. 1A-1D, conventional battery electric vehicle (BEV) electric drive modules (EDMs) include a gearbox or gear reducer that typically comprises only one or two speeds and thus functions completely different than a conventional multi-speed automatic transmission (e.g., having three or more, and more likely four or more speeds). One potential downside of driving a BEV, therefore, is the lack of a traditional driving/shifting experience, could be monotonous and boring to the driver. Accordingly, systems and methods are presented herein that provide for both real and simulated shifts/modes, including power-on upshifts, for BEVs. In other words, a BEV has the flexibility to feel exactly like a traditional internal combustion engine (ICE) vehicle. Because this is electrical/electronic, all mechanical features normally tied to dedicated vehicle hardware can be driver programmable/selectable on the fly. So, in essence, a driver can experience a very mild to wild vehicle at the push of a button. The disclose techniques are aimed at enriching the BEV driving experience by providing torque/speed characteristics at the drive wheels mimicking gear shifting of a conventional ICE based powertrain, for on road drive modes only (normal, sport, etc.).

Wide-open throttle (WOT) driving, typically for track use only (but also applicable to sport mode), will be without simulated shifts and aims to deliver maximum torque at the wheels for all vehicle speeds to maximize performance. The simulated shifts can be offered both ways—automatic and manually commanded (for normal and sport modes). Other driver-selectable modes such as programmable variable throttle progression, start gear ($1^{st}$ or $2^{nd}$, such as for winter) for dual speed EDMs, drift/sand/mud/snow/rock/Baja and others can also be offered dependent on the vehicle type and usage. In a dual-speed EDM application, for example only, normal mode(s) (i.e., not sport/track modes) may typically start in $2^{nd}$ gear, unless a mechanical detent at a very bottom of an accelerator pedal is engaged or pressed (indicative of WOT), in which the system would then "kick down" the dual-speed EDM to $1^{st}$ gear.

Front-to-rear torque split (50%/50%, 60%/40%, 40%/60%, etc.) could also be a driver-selectable or driver-customizable option or mode, as well as torque vectoring (oversteer, understeer, crab walk, etc.). One potential benefit is an improved (e.g., more immersive and fun) driving experience for the driver, which could further expand the already increasing consumer base for BEVs and thereby potentially reduce BEV costs. While BEVs having single or dual gear reducers (as opposed to conventional 3-4+speed automatic transmissions) are specifically described herein, it will be appreciated that these BEVs could have alternative or supplemented sources of high voltage (i.e., aside from the high voltage battery system), such as a range-extender engine generator system or a fuel cell system.

Figure 1A:
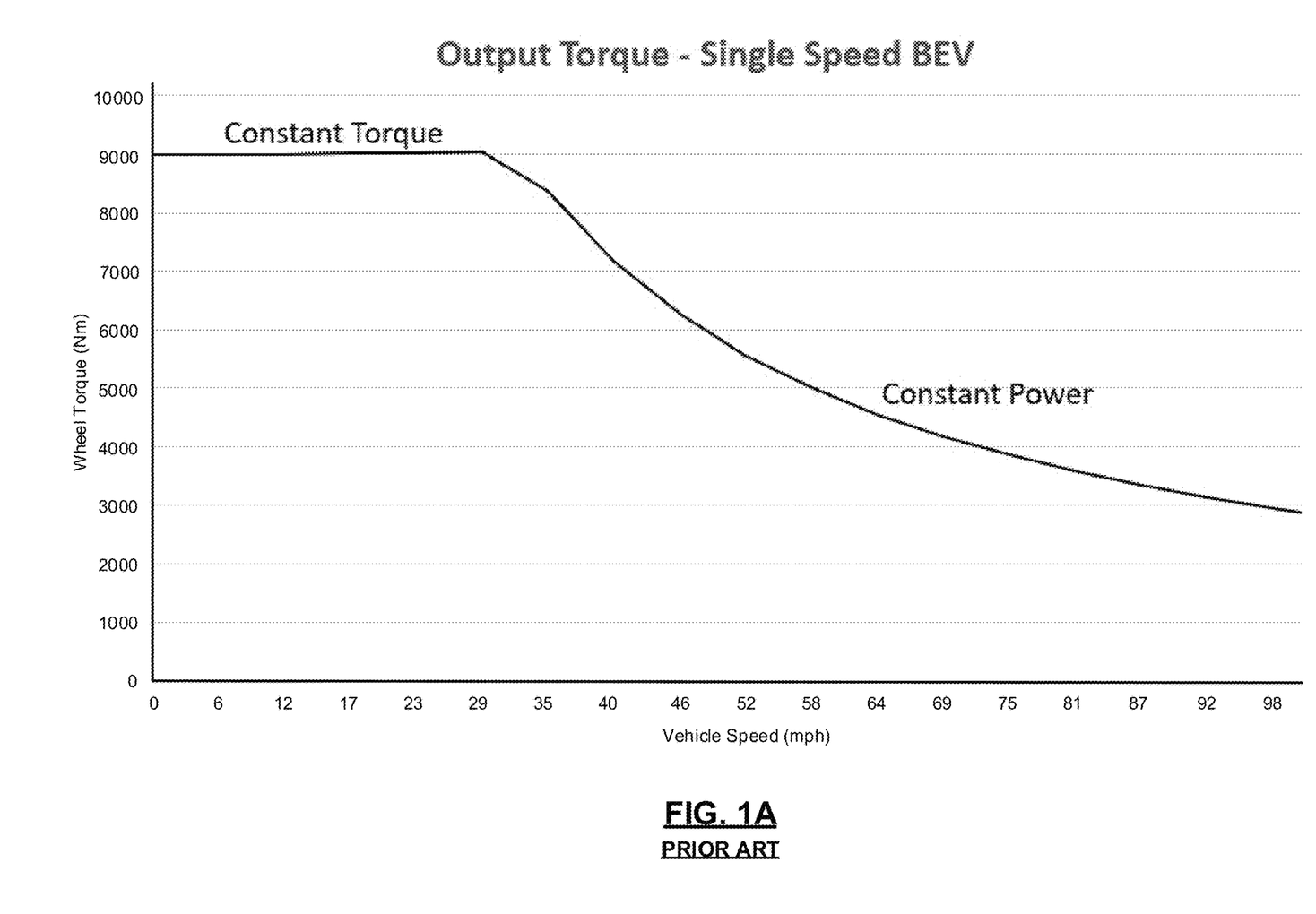
FIGS. 1A-1D are example plots of output torque and output power of single and dual-speed electric drive modules (EDMs) of a battery electric vehicle (BEV) according to the prior art.
Figure 1B:
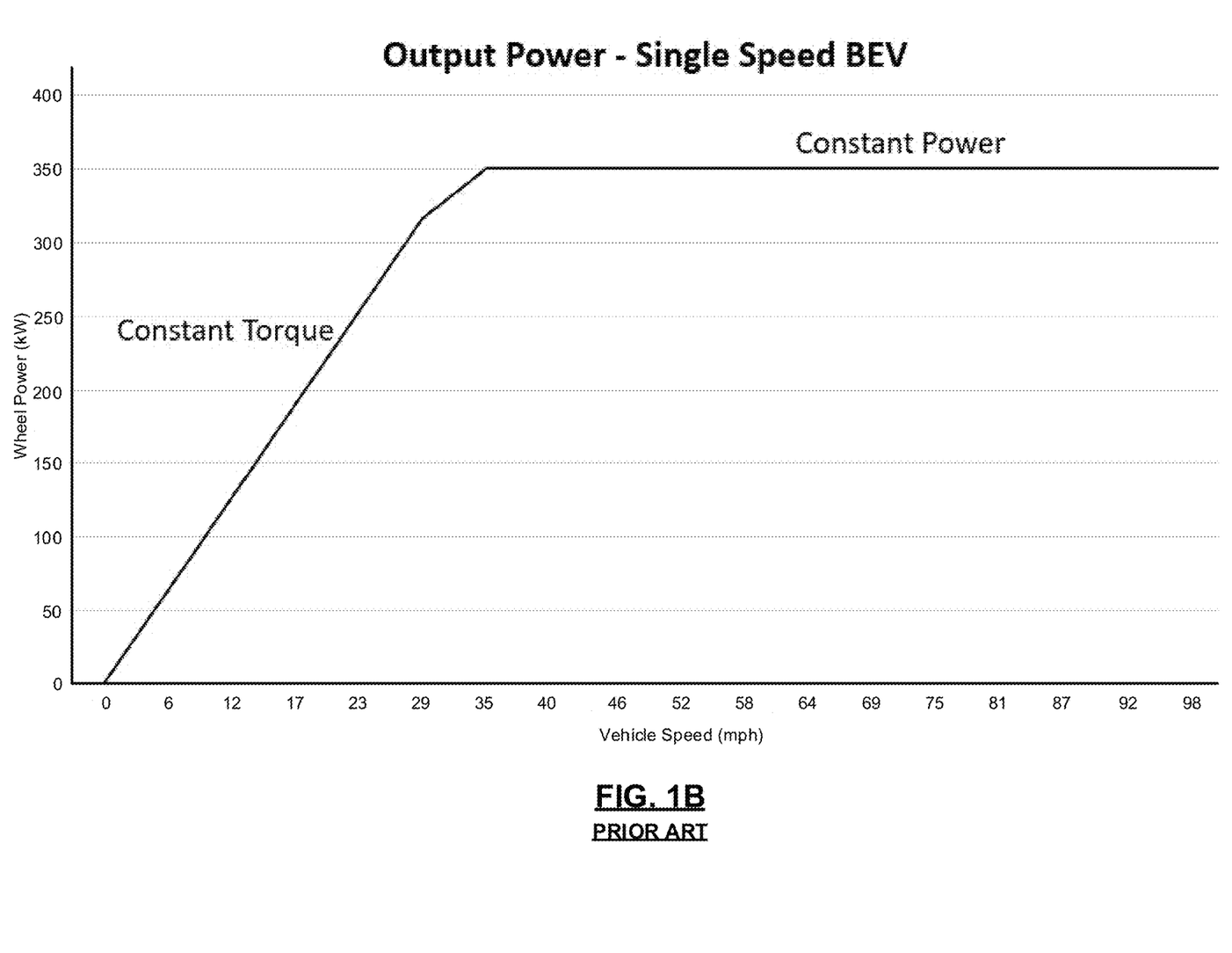
Figure 1C:
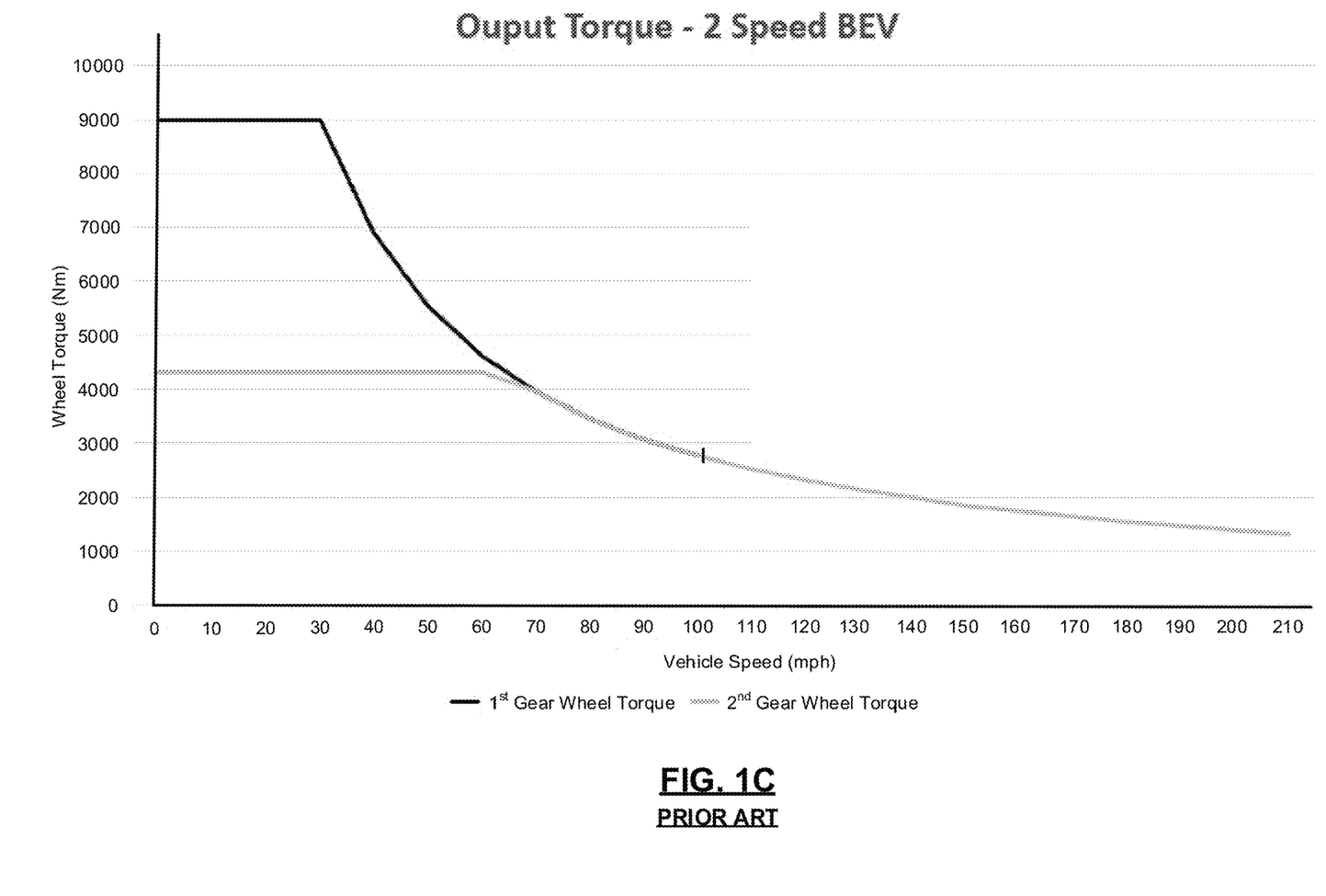
Figure 1D:
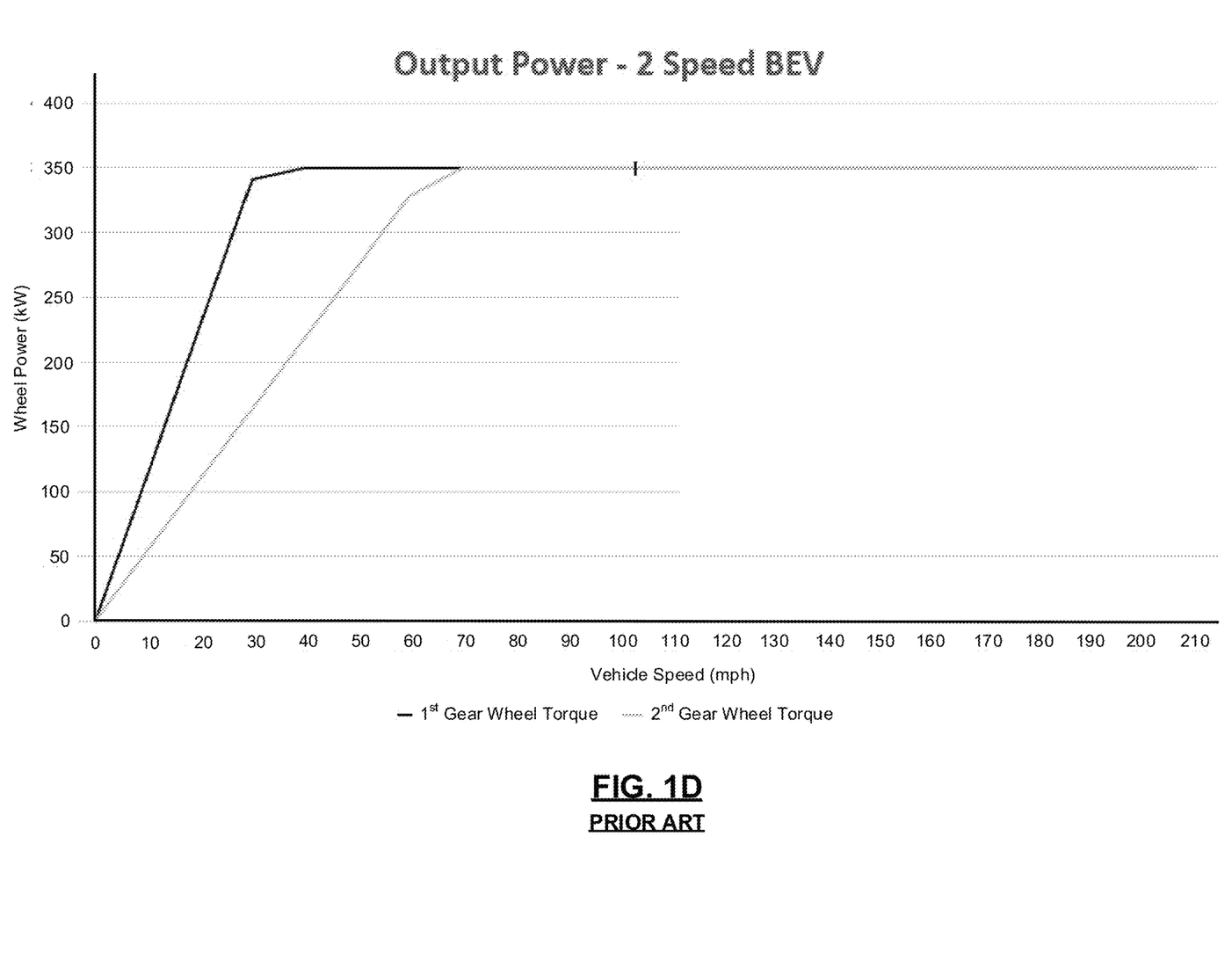
Figure 2A:
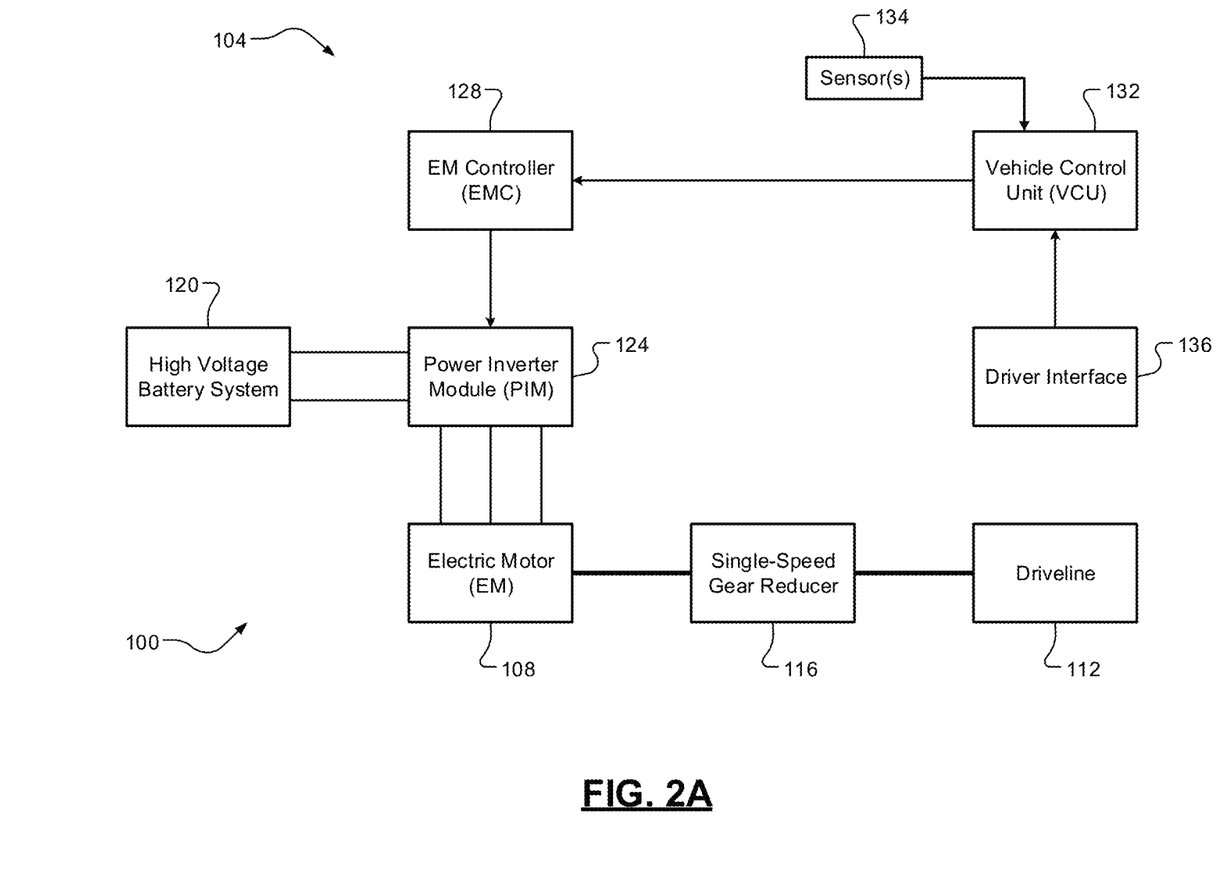
FIG. 2A is a functional block diagram of a battery electric vehicle (BEV) having a single speed electric drive module (EDM) and a shift/mode control system according to the principles of the present application.
Figure 2B:
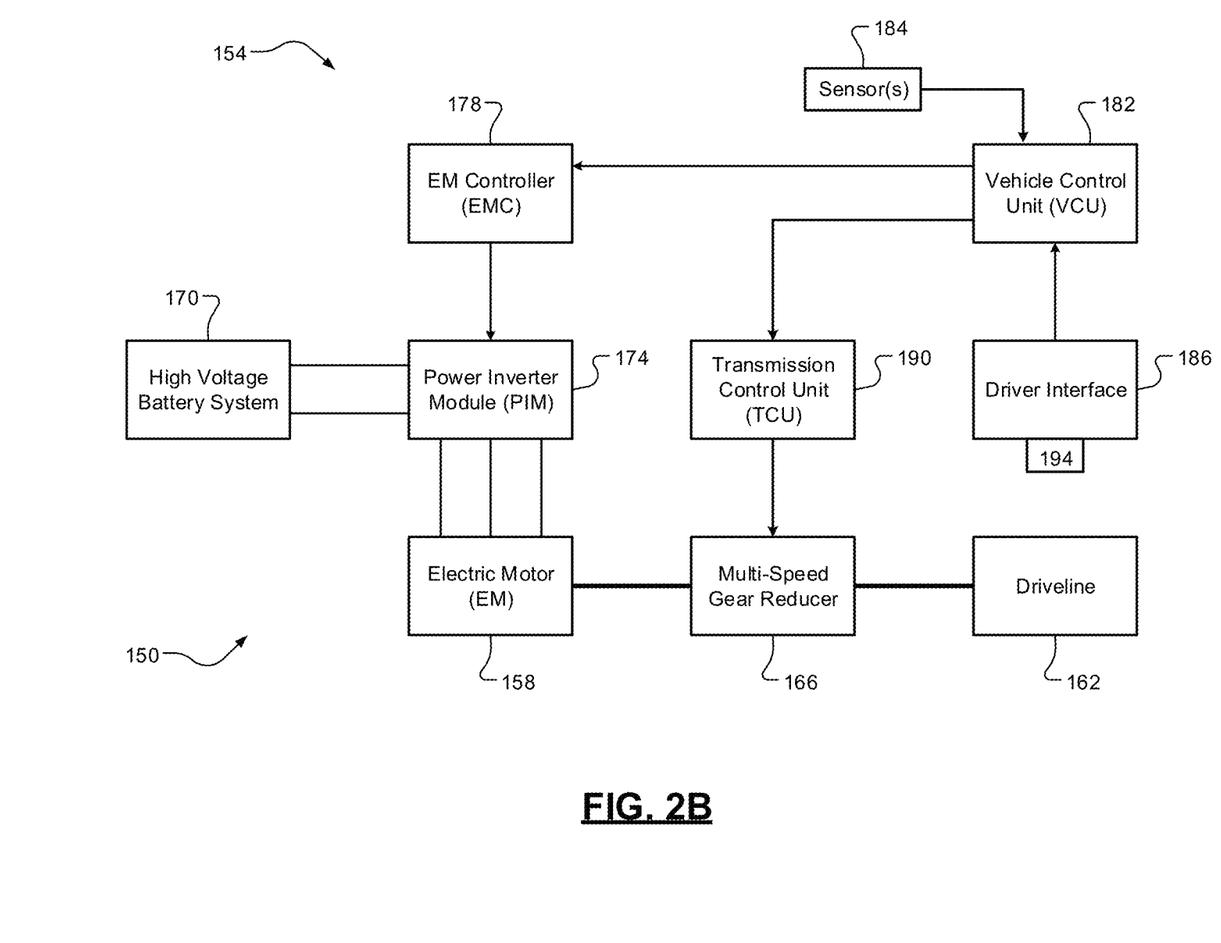
FIG. 2B is a functional block diagram of a BEV having a dual-speed EDM and a shift/mode control system according to the principles of the present application.

Referring now to FIGS. 2A-2B, functional block diagrams of BEVs 100, 150 having single and dual-speed EDMs 104, 154, respectively, and respective shift/mode control systems according to the principles of the present application are illustrated. In FIG. 2A, the EDM 104 comprises an electric machine or motor 108 that generates mechanical drive torque, which is transferred to a driveline 112 (e.g., drive wheels) via a single-speed gear reducer 116 that reduces the speed of the electric motor 108 while also providing the drive torque to the driveline 112. The electric motor 108 is electrically powered by electrical direct current (DC) output by a high voltage battery system 120 and converted/inverted to alternating current (AC) via a power inverter module (PIM) 124. The PIM 124 is controlled by an electric motor controller (EMC) 128 (also referred to herein more generically as "controller 128"), which controls speed, torque, and direction of rotation of the electrical motor 108, while also providing the simulated shifts/modes according to the principles of the present application.

The EMC 128 is controlled by a vehicle control unit (VCU) 132 of the BEV 100 in response to driver input via a driver interface 136 (e.g., an accelerator pedal). In other words, the VCU 132 controls the EMC 128 to operate the electric motor 108 to deliver the driver's intent. It will be appreciated that the EMC 128 and the VCU 132 could be generally identified as a single "controller," noting that they may also be separate/distributed components. The driver interface 136 further allows the driver to select, among other options and for example only, (i) a driving range from park (P), reverse (R), neutral (N), and drive (D) (also referred to as "PRND"), (ii) manual gear shifting instead of D (automatic), (iii) driving mode (mud, snow, sand, etc.), (iv) a number of gears to be simulated, (v) custom shift patterns (skip downshifts, etc.), (vi) programmable variable throttle progression, (vii) calibration mode (normal, sport, track, etc.), and (viii) start gear (e.g., $1^{st}$ or $2^{nd}$ in the case of dual-speed EDMs). Sensor(s) 134 also measure/monitor parameter(s) (e.g., speeds) that are provided to the VCU 132 in addition to the driver input via the driver interface 136 (collectively, "a set of monitored or measured parameters").

In FIG. 2B, the primary differences are the use of a dual-speed gear reducer 166 that is also connected to the VCU 182 via a transmission control unit (TCU) 190 because there are two actual gears/speeds. The remaining components of FIG. 2B are the same as FIG. 2A with corresponding reference numerals (108=158, 112=162, etc.). The TCU 190 controls the transmission gear shifting (i.e., speed/gear of gear reducer 166) amongst other functions based on measured/monitored parameter(s) (e.g., speeds) from sensor (s) 184 and/or the driver's intent/input via the driver interface 186 (collectively, "a set of monitored or measured parameters"). In this configuration of FIG. 2B, the VCU 182 also commands the TCU 190 to operate the gear reducer 166 in the required state to meet torque and speed requirements at the driveline 162 amongst other functions. Lastly, in this configuration of FIG. 2B, the gear reducer 166 has more than one gear state available (e.g., two gears), which typically enables higher launch torques and higher speeds of the BEV 150 for improved performance. A mechanical detent 194 is included as part of the driver interface 186 or separately and is selectively engaged/pressed when an accelerator pedal of the driver interface 186 is fully-depressed (i.e., at a very-bottom position). This mechanical detent 194 is utilizable to convey a driver WOT request that will be honored outside of the typical non-track/sport modes (e.g., during normal mode), and will cause the TCU 190 and the gear reducer 166 to "kick-down" from $2^{nd}$ gear to $1^{st}$ gear.

Figure 3A:
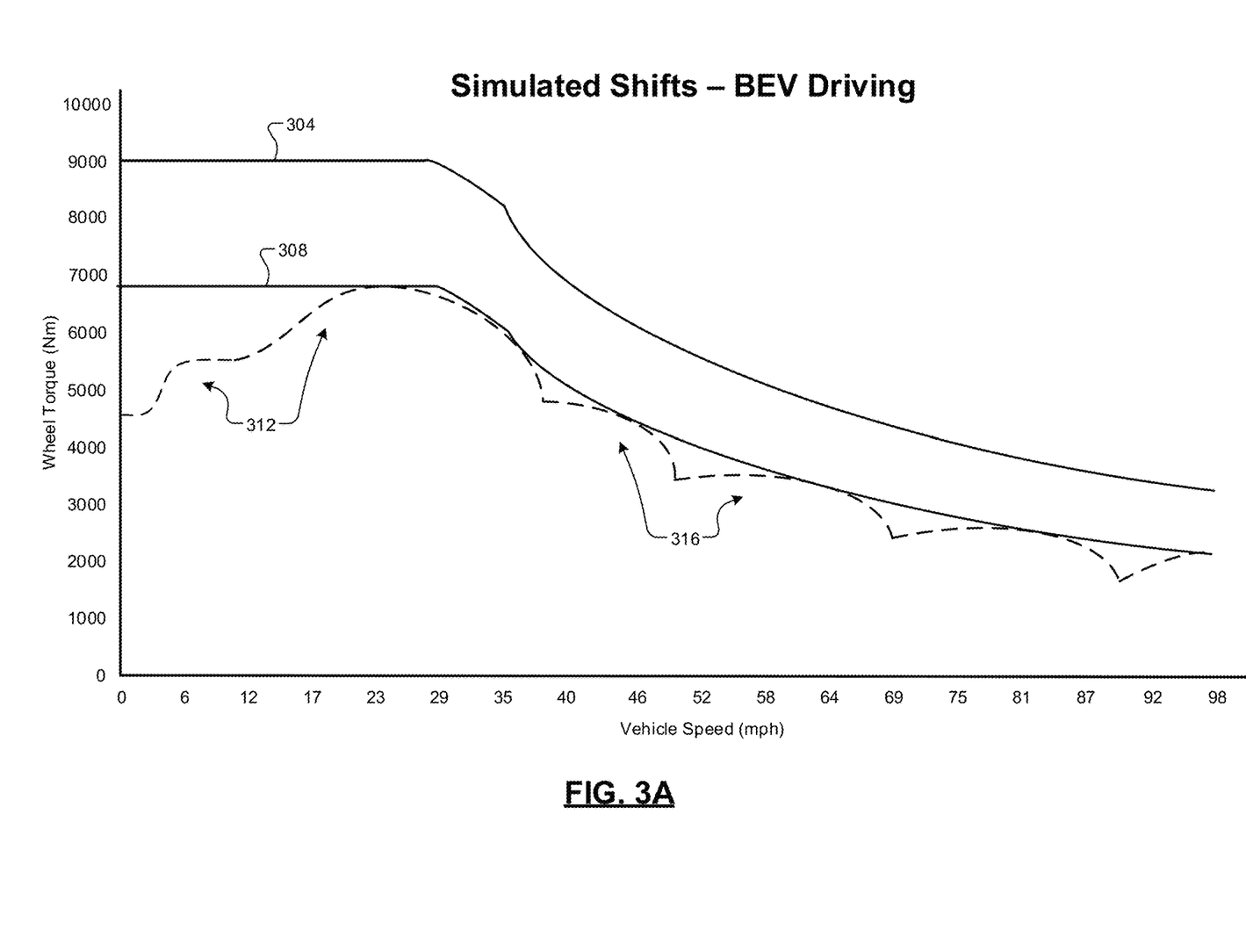
FIGS. 3A-3C are example plots of simulated shifts, including real and simulated power-on upshifts, by the EDMs of FIGS. 2A-2B according to the principles of the present application.
Figure 3B:
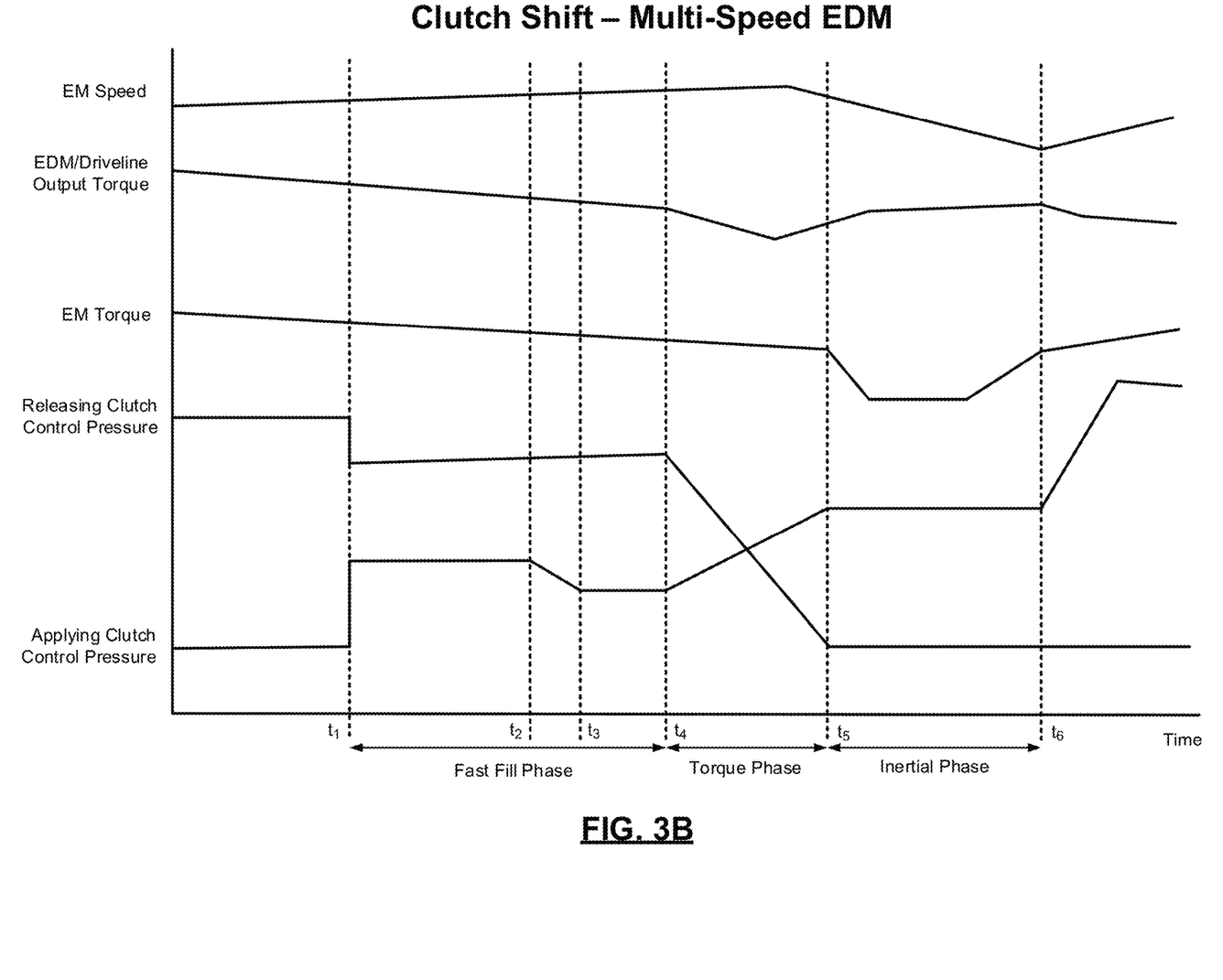
Figure 3C:
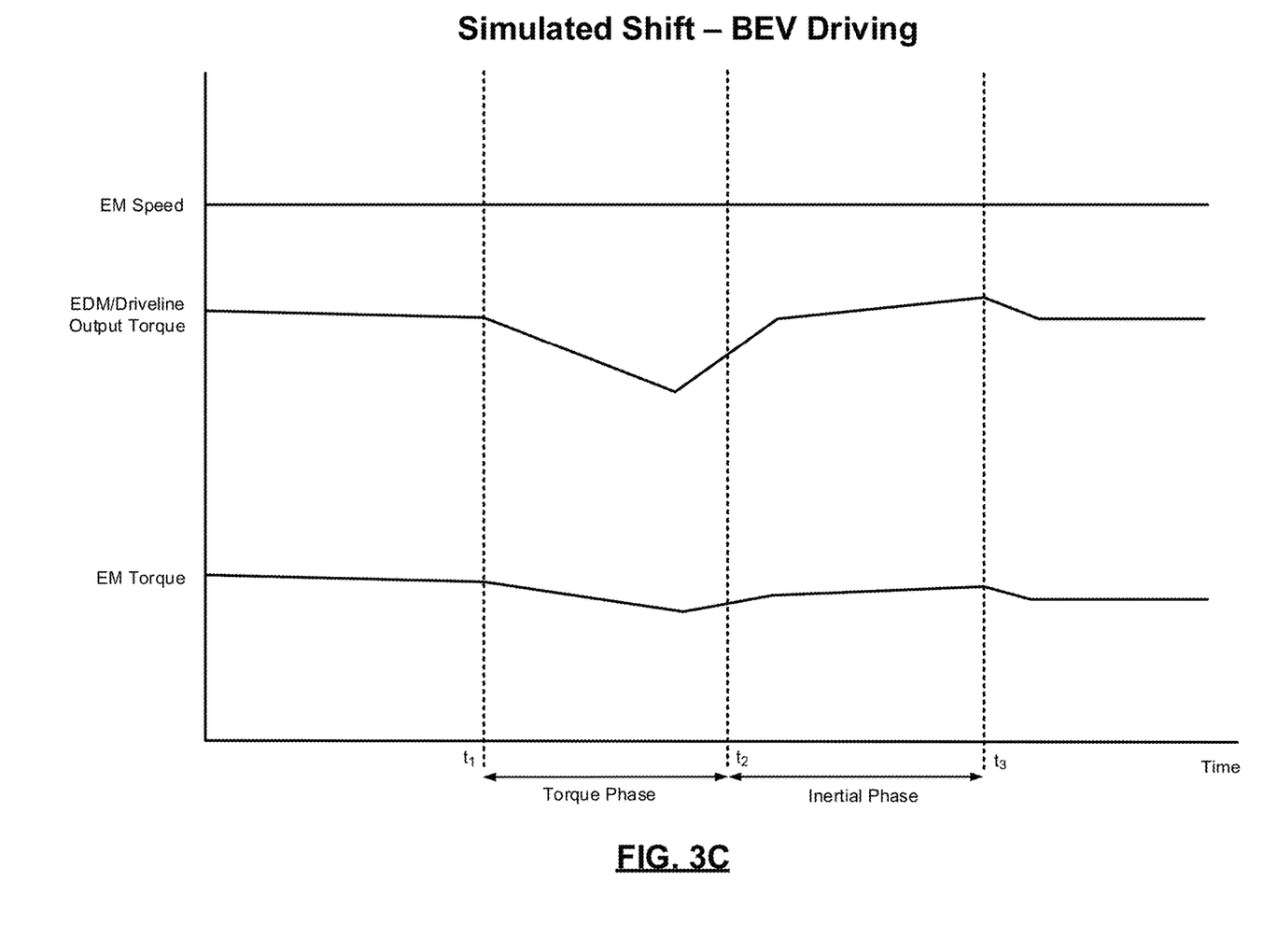

FIGS. 3A-3C are example plots of simulated shifts, including real and simulated power-on upshifts, by the EDMs of FIGS. 2A-2B according to the principles of the present application. As previously mentioned, the EMCs 128, 178 could implement the shifts/modes according to the principles of the present application. It will be appreciated, however, that such control logic of software could be wholly or partially implemented elsewhere in the BEV control system. It will also be appreciated that the control techniques of the present application could be applicable to other suitable BEVs having different configurations than those shown in FIGS. 2A-2B. Referring now to FIG. 3A, WOT is aimed to deliver maximum power according to line 304 (may apply to sport mode, required for track mode). As previously mentioned, in a typical dual-speed EDM application, during normal mode(s) (i.e., non-sport/track modes), the EDM will typically operate in $2^{nd}$ gear (see line 308), unless the mechanical detent 194 is engaged/pressed via the driver interface, upon which they system will "kick-down" to $1^{st}$ gear as WOT is still able to be requested in non-sport/track modes. The blue/top curve 304 is followed without modification (a single speed BEV example shown is, but the logic applies to a dual-speed BEV also). For part (non-WOT) throttle, simulated automatic transmission (AT) shifts are performed to provide a BEV customer a shifting experience of an ICE based powertrain. The red/middle line 308 is an EM torque curve at 75% power level, also referred to herein as a maximum defined torque/power level relative to a maximum achievable torque/power level (line 304).

The EM is controlled to follow the black/bottom line to provide a simulated torque profile of an ICE based powertrain. That is, instead of constant torque we use ascending stair steps, and instead of constant power, we use descending stair steps. In other words, transmission shift operations are simulated by controlling the EDM drive torque output relative to the maximum defined torque level 308 (i) according to ascending torque steps 312 instead of outputting constant torque and (ii) according to descending torque steps 316 instead of outputting constant power. This logic will also apply to power-on upshifts as well as downshifts, which are discussed in more detail below. This same logic also applies to manually commanded shifts. This allows the ability to offer different number of speeds to suit the character of different vehicles (e.g., 2, 3, 4, . . . , N speeds). A single speed EDM will have only simulated shifts, whereas a dual-speed EDM will have simulated shifts as well as a real or actual upshift (e.g., $1^{st}$ to $2^{nd}$). The real shift can be integrated suitably with the simulated shifts (e.g., $1^{st}$ to $2^{nd}$ real shift, 2-3, 3-4, . . . , N-1 to N as simulated shifts). The driver interface collects driver commands (including simulated shifting, number of speeds to be simulated, etc.) and feeds them to VCU which then controls EM to implement these commands.

Referring now to FIG. 3B and with continued reference to the previous FIGS., real power-on upshifting happens as shown/explained in the diagram, such as for configuration 150 of FIG. 2B having the dual-speed gear reducer 166 and the TCU 190 (e.g., $1^{st}$ to $2^{nd}$ gear shifts, and vice-versa). First, an applying or on-coming clutch is fast-filled and put in slip control. Next, during the torque phase, torque is handed off by a releasing off-going clutch to the applying clutch by adjusting the clutch pressures. Next, during the inertia or inertial phase, the EM torque is adjusted to allow EM speed change to happen. Lastly, at the end of inertial phase, the apply clutch is fully synchronized and locked up by increasing pressure behind its piston. We can have three or more calibrations that can be distinguished as by the quickness of the shifts, for example only: (1) normal-600 milliseconds (ms) (torque phase plus inertia phase times), (2) sport-400 ms, and (3) track-200 ms. For a given throttle level, track shift can happen at higher vehicle speeds compared to normal and sport shifts (i.e., different shift patterns).

Referring now to FIG. 3C and with continued reference to the previous FIGS., simulated upshifting happens as shown/explained in the diagram. In this case, the clutches do not play any role and the EM speed does not change during the shift. Instead, only the output torque profile is simulated by controlling the EM torque. Similar to above, we can have three or more calibrations where the difference can be created by the quickness of the shifts, for example only: (1) normal-600 ms, (2) sport-400 ms, and (3) track-no simulated shifts in order to achieve maximum performance. These ramp periods or rates are definable by the selected shift mode or as otherwise customized by the driver. For a given throttle level, sport shifts can happen at higher vehicle speeds compared to normal shifts (i.e., different shift patterns). In addition, double/triple skip downshifts can also be mimicked during part throttle driving. As previously discussed, a "kick-down" downshift (from $2^{nd}$ gear to $1^{st}$ gear) could also be executed for a dual-speed EDM application (e.g., FIG. 2B) when the mechanical detent 194 is engaged/pressed by a fully-depressed accelerator pedal of the driver interface 186.

Figure 4:
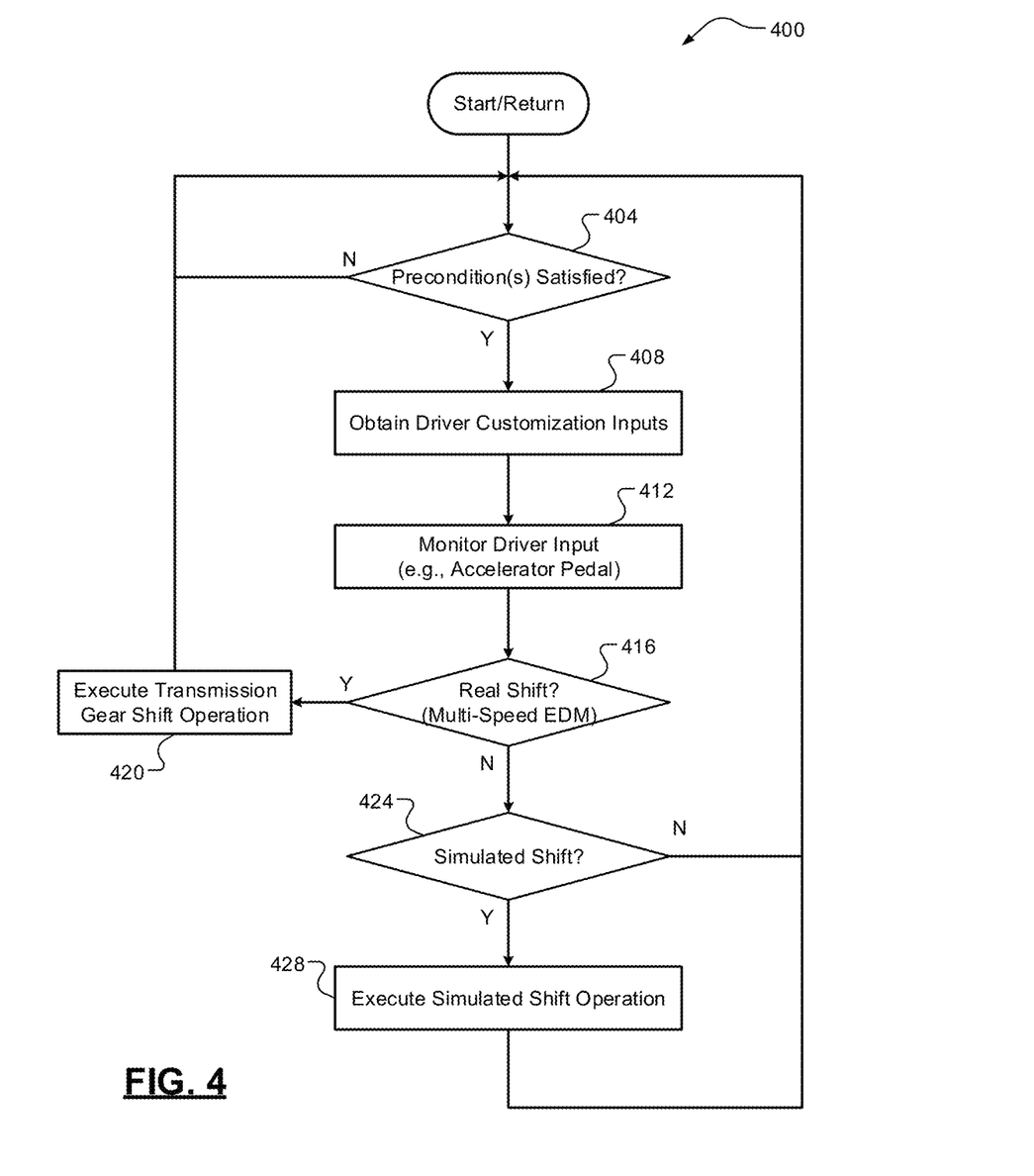
FIG. 4 is a flow diagram of an example simulated shift method for a BEV according to the principles of the present application.

Referring now to FIG. 4, a flow diagram of an example simulated shift method 400 for a BEV according to the principles of the present application is illustrated. For illustrative/explanatory purposes, components of BEVs 100/150 will be referenced, but it will be appreciated that this method 400 could be applicable to any suitable BEV (e.g., without an internal combustion engine and a conventional multi-speed automatic transmission). At 404, a controller of the BEV 100/150 determines whether a set of precondition(s) are satisfied. This could include, for example only, the BEV being on/powered-up, the transmission being in forward/drive, and there being no malfunctions present. When true, the method 400 proceeds to 408. Otherwise, the method 400 ends or returns to 404. At 408, the controller gathers driver customization inputs (e.g., via driver interface 132/182), such as specifying a shift mode (normal, sport, track, etc.) and a number of gear shifts (e.g., 1 through n, where n equals 5). At 412, the controller monitors/measures a set of other parameter(s) (e.g., via sensor(s) 134/184). At 416, based on this collective received information, the controller determines whether an actual transmission shift operation should occur. This could be limited to, for example, BEV 150 where there is a dual or dual-speed gear reducer 166 and a TCU 190.

When true, the method 400 proceeds to 420 where the controller executes the transmission shift operation (see, e.g., FIG. 3B) and the method 400 ends or returns to 404 for one or more additional cycles. When false the method 400 proceeds to 424. At 424, based on the collective received information, the controller determines whether a simulated shift operation should be performed. When true, the method 400 proceeds to 428 where the controller executes the simulated shift operation (see, e.g., FIG. 3C) and the method 400 ends or returns to 404 for one or more additional cycles. Otherwise, the method 400 directly ends or returns to 404 for one or more additional cycles.

It will be appreciated that the term "controller" (as well as "module" and "unit") as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A simulated shift system for a battery electric vehicle (BEV), the simulated shift system comprising:
   a set of sensors configured to monitor a set of parameters indicative of driver input by a driver of the BEV; and
   a controller configured to:
      control an electric drive module (EDM) of the BEV, the EDM comprising a gear system connected to an electric motor and being configured to output drive torque to a driveline of the BEV, wherein the EDM is a dual or dual-speed EDM and the gear system has at least two gears and the EDM has a transmission control module (TCM) for controlling actual shifting between the at least two gears;
      receive the monitored set of parameters; and
      based on the monitored set of parameters, selectively control the EDM to adjust drive torque output therefrom to simulate transmission shift operations of a predetermined conventional automotive automatic transmission having four or more speeds.

2. The simulated shift system of claim 1, wherein the monitored set of parameters include at least one of (i) a shifting mode, (ii) a maximum defined torque level relative to a maximum torque level achievable by the EDM, and (iii) a number of shift speeds.

3. The simulated shift system of claim 2, wherein the controller is configured to control the EDM to adjust the EDM drive torque output to simulate transmission shift operations by controlling the EDM drive torque output relative to the maximum defined torque level (i) according to ascending torque steps instead of outputting constant torque and (ii) according to descending torque steps instead of outputting constant power.

4. The simulated shift system of claim 2, wherein the controller is configured to simulate a particular transmission shift operation by (i) maintaining the electric motor at a constant speed and during a first simulated torque phase, decreasing the torque output of the EDM at a first defined rate and, during a subsequent second simulated inertia phase, increasing the torque output of the EDM at a second defined rate.

5. The simulated shift system of claim 4, wherein the first and second defined rates correspond to the shifting mode.

6. The simulated shift system of claim 1, wherein the EDM is configured to (i) operate in a second higher gear and not a lower first gear unless (ii) an accelerator pedal is fully depressed at wide-open throttle (WOT), wherein the EDM is configured to output its maximum achievable drive torque beginning in the lower first gear.

7. The simulated shift system of claim 1, wherein the BEV does not include an internal combustion engine or the predetermined conventional automotive automatic transmission having four or more speeds configured for use with the internal combustion engine.

8. A simulated shift method for a battery electric vehicle (BEV), the simulated shift system method comprising:
   monitoring, by a controller of the BEV and using a set of sensors, a set of parameters indicative of driver input by a driver of the BEV;
   controlling, by the controller, an electric drive module (EDM) of the BEV, the EDM comprising a gear system connected to an electric motor and being configured to output drive torque to a driveline of the BEV, wherein the EDM is a dual or dual-speed EDM and the gear system has at least two gears and the EDM has a transmission control module (TCM) for controlling actual shifting between the at least two gears;
   receiving, by the controller, the monitored set of parameters; and
   based on the monitored set of parameters, selectively controlling, by the controller, the EDM to adjust drive torque output therefrom to simulate transmission shift operations of a predetermined conventional automotive automatic transmission having four or more speeds.

9. The simulated shift method of claim 8, wherein the monitored set of parameters include at least one of (i) a shifting mode, (ii) a maximum defined torque level relative to a maximum torque level achievable by the EDM, and (iii) a number of shift speeds.

10. The simulated shift method of claim 9, wherein controlling the EDM to adjust the EDM drive torque output to simulate transmission shift operations further comprises controlling, by the controller, the EDM drive torque output relative to the maximum defined torque level (i) according to ascending torque steps instead of outputting constant torque and (ii) according to descending torque steps instead of outputting constant power.

11. The simulated shift method of claim 9, wherein simulating a particular transmission shift operation further comprises (i) maintaining, by the controller, the electric motor at a constant speed and) during a first simulated torque phase, decreasing, by the controller, the torque output of the EDM at a first defined rate and, during a subsequent second simulated inertia phase, increasing, by the controller, the torque output of the EDM at a second defined rate.

12. The simulated shift method of claim 11, wherein the first and second defined rates correspond to the shifting mode.

13. The simulated shift method of claim 8, wherein the EDM is configured to (i) operate in a second higher gear and not a lower first gear unless (ii) an accelerator pedal is fully-depressed at wide-open throttle (WOT) he EDM is configured to output its maximum achievable drive torque beginning in the lower first gear.

14. The simulated shift method of claim 8, wherein the BEV does not include an internal combustion engine or the predetermined conventional automotive automatic transmission having four or more speeds configured for use with the internal combustion engine.

* * * * *